(12) United States Patent
Ohmi et al.

(10) Patent No.: US 7,436,999 B2
(45) Date of Patent: Oct. 14, 2008

(54) DATA ANALYSIS DEVICE AND DATA RECOGNITION DEVICE

(75) Inventors: Tadahiro Ohmi, Miyagi (JP); Koji Kotani, Miyagi (JP); Feifei Lee, Miyagi (JP)

(73) Assignee: Tadahiro OHMI, Miyagi (JP)

( * ) Notice: Subject to any disclaimer, the term of this patent is extended or adjusted under 35 U.S.C. 154(b) by 553 days.

(21) Appl. No.: 10/548,760

(22) PCT Filed: Mar. 2, 2004

(86) PCT No.: PCT/JP2004/002526

§ 371 (c)(1),
(2), (4) Date: Oct. 21, 2005

(87) PCT Pub. No.: WO2004/081872

PCT Pub. Date: Sep. 23, 2004

(65) Prior Publication Data
US 2006/0088212 A1 Apr. 27, 2006

(30) Foreign Application Priority Data
Mar. 11, 2003 (JP) .............................. 2003-065517

(51) Int. Cl.
G06K 9/00 (2006.01)

(52) U.S. Cl. .................... 382/170; 382/195; 382/260
(58) Field of Classification Search ................. 382/118, 382/168, 170, 181, 190, 192, 195, 253, 260, 382/305
See application file for complete search history.

(56) References Cited

U.S. PATENT DOCUMENTS
5,668,898 A 9/1997 Tsutsuta
(Continued)

FOREIGN PATENT DOCUMENTS
JP 7-099581 4/1995
(Continued)

OTHER PUBLICATIONS
K. Kotani et al., "Face Recognition Using Vector Quantization Histogram Method," IEEE International Conference on Image Processing, 2002, pp. II-105-II-108.

*Primary Examiner*—Phuoc Tran
(74) *Attorney, Agent, or Firm*—Foley & Lardner LLP

(57) ABSTRACT

The data analysis device 100 includes: difference calculation means (S2) for, with respect to an image, carrying out a calculation of calculating a difference between intensity values at an arbitrary point in the image and a point located in the vicinity of the arbitrary point in a first direction as a first intensity difference of the arbitrary point and of calculating a difference between intensity values at the arbitrary point and a point located in the vicinity of the arbitrary point in a second direction different from the first direction as a second intensity difference of the arbitrary point, the difference calculation means carrying out the calculation with respect to each of a plurality of points in the image; and frequency distribution generation means (S3 to S5) for quantizing a vector comprising the first intensity difference and the second intensity difference obtained by the difference calculation means for each of the plurality of points in the image into a single region of a plurality of regions (regions represented by the index numbers 0 to 49 of the quantization table in FIG. 4) divided by a predetermined region division method and generating a frequency distribution of the plurality of regions by using the number of vectors quantized for each of the plurality of regions as frequency of the corresponding region.

16 Claims, 4 Drawing Sheets

U.S. PATENT DOCUMENTS

| | | | | |
|---|---|---|---|---|
| 5,867,593 A | * | 2/1999 | Fukuda et al. | 382/176 |
| 6,115,495 A | * | 9/2000 | Tachikawa et al. | 382/165 |
| 6,865,295 B2 | * | 3/2005 | Trajkovic | 382/170 |
| 7,162,076 B2 | * | 1/2007 | Liu | 382/159 |

FOREIGN PATENT DOCUMENTS

| | | |
|---|---|---|
| JP | 2000-101437 A | 4/2000 |
| JP | 2002-203241 A | 7/2002 |

* cited by examiner

INPUT IMAGE

| θ | -π/8 | π/8 | 3π/8 | 5π/8 | 7π/8 | 9π/8 | 11π/8 | 13π/8 | 15π/8 |
|---|---|---|---|---|---|---|---|---|---|
| r | | | | | | | | | |
| 1 | 0 ||||||||  |
| 2 | 1 | 2 | 3 | 4 | 5 | 6 | 7 | 8 ||
| 4 | 9 | 10 | 11 | 12 | 13 | 14 | 15 | 16 ||
| 7 | 17 | 18 | 19 | 20 | 21 | 22 | 23 | 24 ||
| 12 | 25 | 26 | 27 | 28 | 29 | 30 | 31 | 32 ||
| 20 | 33 | 34 | 35 | 36 | 37 | 38 | 39 | 40 ||
| 30 | 41 | 42 | 43 | 44 | 45 | 46 | 47 | 48 ||
|  | 49 |||||||||

INDEX NUMBER

DATA ANALYSIS DEVICE AND DATA RECOGNITION DEVICE

TECHNICAL FIELD

This invention relates to a data analysis device for analyzing image data. This invention further relates to a data recognition device using such a data analysis device and, in particular, relates to a data recognition device effective as a recognition device for an image such as a face.

BACKGROUND ART

Recently, attention has been paid to individual identification/authentication systems that make use of biometrical features of individuals such as faces, voices, fingerprints, and iris patterns. Among them, face recognition is considered the most natural and most effective method for identifying an individual because it is like what a human being does and it does not require use of particular facilities. In the face recognition, extraction of features of an individual face is a key for construction of a more effective system. Although many feature extraction techniques have been proposed, these techniques are fairly complicated and therefore it is difficult to apply them to real-time face recognition.

Recently, there has been proposed a very simple and highly reliable face recognition method on the basis of a vector quantization (VQ) algorithm (see Non-Patent Document 1 below).

Similar data recognition devices are disclosed also in Patent Document 1 and Patent Document 2 below.

Non-Patent Document 1:

K. Kotani, C. Qiu, and T. Ohmi, "Face Recognition Using Vector Quantization Histogram Method", Proc. 2002 Int. Conf. on Image Processing, Vol. II of III, pp. II-105-II-108, 2002

Patent Document 1:

Japanese Unexamined Patent Application Publication (JP-A) No. 2000-101437

Patent Document 2:

Japanese Unexamined Patent Application Publication (JP-A) No. 2002-203241

In the foregoing face recognition method, a histogram generated from usage frequency of each of code vectors obtained by VQ processing of a face image is used as a very effective individual feature extraction technique. By applying proper filtering and VQ processing to a face image, it is possible to extract useful features for face recognition. The result of a test using the AT&T face database showed a recognition rate of 95.6%. When a 1.1 GHz personal computer is used, a processing time for one image is 194 msec. The VQ histogram method is much simpler and faster than previous face recognition methods but is still not sufficient for application to high-speed data recognition such as video rate (standard video is 30 frames per second and the video rate represents an image recognition speed of about 33 msec corresponding to one frame) recognition.

DISCLOSURE OF THE INVENTION

Therefore, it is an object of this invention is to provide a data analysis device that achieves high processing speed and a data recognition device using such a data analysis device, thereby enabling high-speed data recognition.

Data analysis devices and data recognition devices according to this invention are as follows.

(1) A data analysis device characterized by comprising difference calculation means for, with respect to an image, carrying out a calculation of calculating a difference between intensity values at an arbitrary point in said image and a point located in the vicinity of said arbitrary point in a first direction as a first intensity difference of said arbitrary point and of calculating a difference between intensity values at said arbitrary point and a point located in the vicinity of said arbitrary point in a second direction different from said first direction as a second intensity difference of said arbitrary point, said difference calculation means carrying out said calculation with respect to each of a plurality of points in said image, and frequency distribution generation means for allocating a vector comprising said first intensity difference and said second intensity difference obtained by said difference calculation means for each of the plurality of points in said image to a single region of a plurality of regions divided by a predetermined region division method and generating a frequency distribution of said plurality of regions by using the number of vectors allocated to each of said plurality of regions as frequency of the corresponding region.

(2) A data analysis device according to the above-described item (1), characterized by producing feature data by extracting a frequency distribution of at least a part of said plurality of regions from the frequency distribution of said plurality of regions generated by said frequency distribution generation means.

(3) A data analysis device according to the above-described item (1) or (2), characterized by applying filtering to said image before said difference calculation means carries out said calculation with respect to said image.

(4) A data recognition device characterized by comprising frequency distribution storage means for storing information of one or more frequency distributions with respect to at least one or more images, difference calculation means for, with respect to an image, carrying out a calcultion of calculating a difference between intensity values at an arbitrary point in said image and a point located in the vicinity of said arbitrary point in a first direction as a first intensity difference of said arbitrary point and of calculating a difference between intensity values at said arbitrary point and a point located in the vicinity of said arbitrary point in a second direction different from said first direction as a second intensity difference of said arbitrary point, said difference calculation means carrying out said calculation with respect to each of a plurality of points in said image, frequency distribution generation means for allocating a vector comprising said first intensity difference and said second intensity difference obtained by said difference calculation means for each of the plurality of points in said image to a single region of a plurality of regions divided by a predetermined region division method and generating a frequency distribution of said plurality of regions by using the number of vectors allocated to each of said plurality of regions as frequency of the corresponding region, and comparison means for comparing between one or more frequency distributions about said image generated by said frequency distribution generation means and said one or more frequency distributions in said frequency distribution storage means.

(5) A data recognition device according to the above-described item (4), characterized in that said comparison means compares between said one or more frequency distributions about said image generated by said frequency distribution generation means and said frequency distributions in said frequency distribution storage means and selects the frequency distribution specified by a predetermined comparison function from the respective frequency distributions stored in said frequency distribution storage means.

(6) A data recognition device according to the above-described item (5), characterized in that said one or more frequency distributions about said image generated by said frequency distribution generation means are one or more frequency distributions of a part of said plurality of regions extracted from the frequency distribution of said plurality of regions generated by said frequency distribution generation means.

(7) A data recognition device according to any of the above-described items (4) to (6), characterized by applying filtering to said image before said difference calculation means performs said calculation with respect to said image.

(8) A data recognition device characterized by comprising
filter means for applying filtering to input image data,
difference calculation means for, with respect to the image data applied with the filtering by said filter means, carrying out a calcultion of calculating an intensity difference dIx of an arbitrary point in an x-direction in an image as a difference between an intensity value at said arbitrary point and an intensity value at a point on a right or left side of said arbitrary point and of calculating an intensity difference dIy of said arbitrary point in a y-direction as a difference between the intensity value at said arbitrary point and an intensity value at a point on a lower or upper side of said arbitrary point, said difference calculation means carrying out said calculation with respect to each of a plurality of points in said image,
frequency distribution generation means for allocating a vector comprising said intensity difference in the x-direction and said intensity difference in the y-direction obtained by said difference calculation means for each of the plurality of points in said image to a single region of a plurality of regions divided by a predetermined region division method and generating a frequency distribution of said plurality of regions by using the number of vectors allocated to each of said plurality of regions as frequency of the corresponding region,
frequency distribution storage means for storing information of at least one or more frequency distributions, and
comparison means for comparing between the frequency distribution about said input image data generated by said frequency distribution generation means and said frequency distributions in said frequency distribution storage means and selecting the frequency distribution specified by a predetermined comparison function from the respective frequency distributions stored in said frequency distribution storage means.

(9) A data recognition device characterized by comprising
a plurality of filter means for applying a plurality of filtering processes to input image data,
difference calculation means for, with respect to the image data applied with the filtering processes by said plurality of filter means, carrying out a calcultion of calculating an intensity difference dIx of an arbitrary point in an x-direction in an image as a difference between an intensity value at said arbitrary point and an intensity value at a point on a right or left side of said arbitrary point and of calculating an intensity difference dIy of said arbitrary point in a y-direction as a difference between the intensity value at said arbitrary point and an intensity value at a point on a lower or upper side of said arbitrary point, said difference calculation means carrying out said calculation with respect to each of a plurality of points in said image,
frequency distribution generation means for allocating a vector comprising said intensity difference in the x-direction and said intensity difference in the y-direction obtained by said difference calculation means for each of the plurality of points in said image to a single region of a plurality of regions divided by a predetermined region division method and generating a frequency distribution of said plurality of regions by using the number of vectors allocated to each of said plurality of regions as frequency of the corresponding region,
frequency distribution storage means for storing, in a plurality of sets, information of the frequency distributions of said plurality of regions, and
comparison means for comparing between the frequency distribution about said input image data generated by said frequency distribution generation means and the respective sets of the frequency distributions in said frequency distribution storage means and selecting one set of the frequency distributions specified by a predetermined comparison function from the respective sets of the frequency distributions stored in said frequency distribution storage means.

(10) A data recognition device according to any of the above-described items 5, 6, 8 and 9, characterized by comprising frequency distribution registration means for registering the frequency distribution generated by said frequency distribution generation means into said frequency distribution storage means when, as a result of the comparison by said comparison means, the frequency distribution to be selected by said predetermined comparison function does not exist in said frequency distribution storage means.

According to this invention, there are obtained a data analysis device that achieves high processing speed and a data recognition device using such a data analysis device, thereby enabling high-speed data recognition or instantaneous data recognition.

BEST MODE FOR CARRYING OUT THE INVENTION

Now, an embodiment of this invention will be described with reference to the drawings.

The present inventors have developed a new, very simple, and effective high-speed data recognition method called an adjacent pixel intensity difference quantization (APIDQ) histogram method, which enables high-speed data recognition (e.g. video-rate face recognition).

Figure 1:
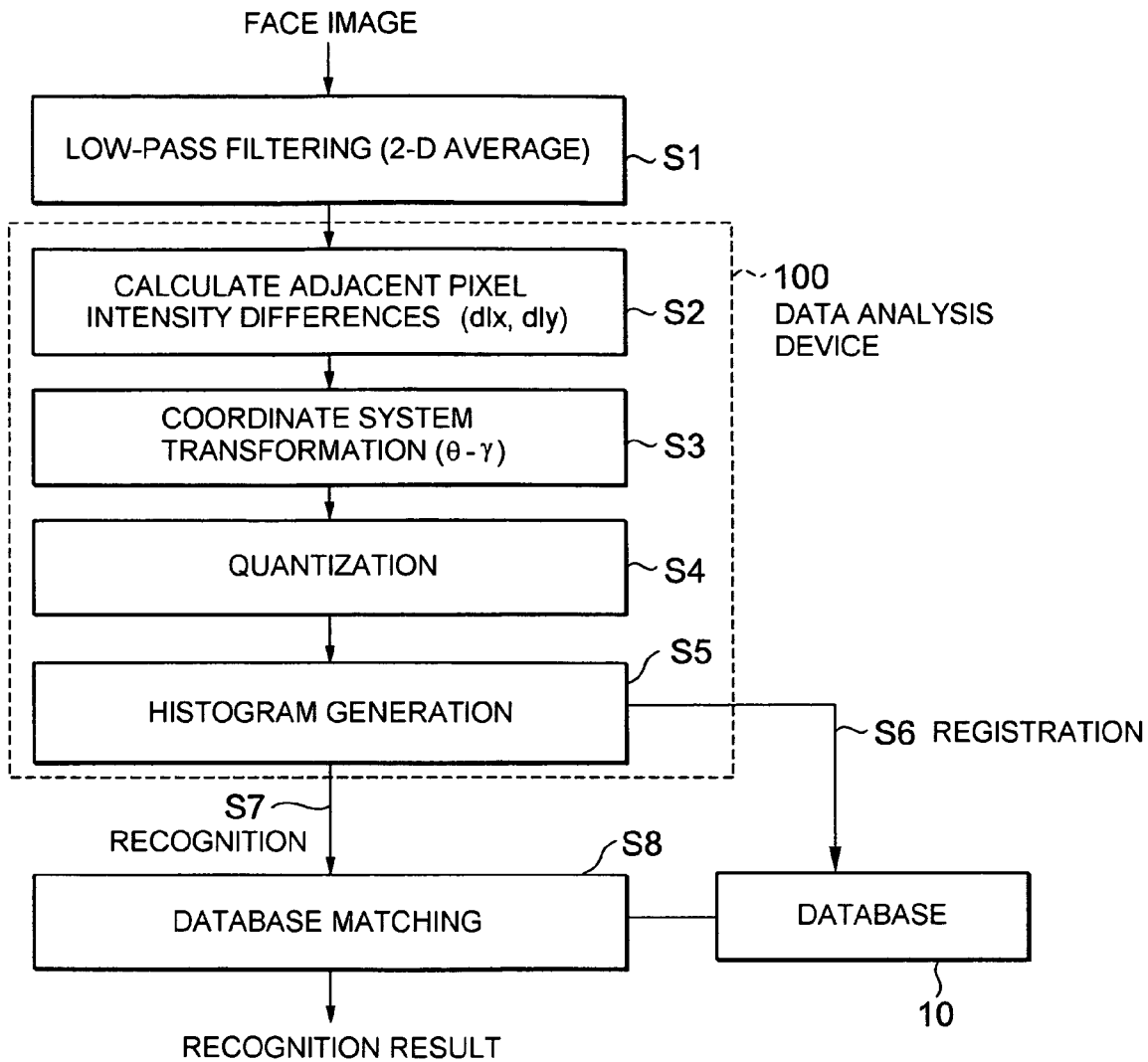
FIG. 1 is a flowchart showing recognition processing steps of an adjacent pixel intensity difference quantization (APIDQ) histogram method used in a data recognition device according to an embodiment of this invention.

FIG. 1 shows processing steps of the adjacent pixel intensity difference quantization (APIDQ) histogram method used in a data recognition device according to the embodiment of this invention.

At first, referring to FIG. 1, description will be briefly made about the adjacent pixel intensity difference quantization (APIDQ) histogram method used in the embodiment of this invention.

In FIG. 1, a face image is subjected to later-described low-pass filtering (step S1) and then adjacent pixel intensity differences are calculated (step S2).

In step S2, a two-dimensional vector (i.e. an intensity change vector consisting of an intensity difference (dIx) between pixels adjacent in the horizontal direction and an intensity difference (dIy) between pixels adjacent in the vertical direction) is calculated at each pixel position in the input image. The two-dimensional vector (intensity change vector consisting of dIx and dIy) at each pixel position in the input image includes information about an intensity change angle (θ) and its amount (r).

The intensity change vectors calculated for all the pixels in the image are plotted in the r-θ plane (step S3 (coordinate transformation to a θ-r system)).

Thereafter, each vector is quantized with respect to its θ value and r value (step S4). By counting the number of elements included in each of regions quantized in the r-θ plane, a histogram can be generated (step S5). The histogram obtained by the APIDQ of the face image is used as very effective individual features.

By combining the appropriate low-pass filtering as pre-processing of a face image and the APIDQ, it is possible to extract useful features for face recognition.

The test result shows a recognition rate of 95.7% with respect to 400 images of 40 individuals (10 images per individual) from the publicly available AT&T (American Telephone and Telegraph Company) face database. By the use of a table lookup (TLU) method in the quantization step, the total recognition processing time is only 31 msec, which enables face recognition at video rate.

Now, description will be made in detail about each of the steps of the adjacent pixel intensity difference quantization (APIDQ) histogram method of FIG. 1.

The adjacent pixel intensity difference quantization (APIDQ) histogram method shown in FIG. 1 is quite similar to the VQ histogram method except the feature extraction procedure. The former (VQ histogram) method makes use of the VQ processing therefore. The VQ histogram method uses a very basic codebook composed of 33 regular code vectors and applies the VQ processing to an intensity change image block where the DC component was removed. This is the essence of the VQ histogram method and the processing is merely to detect a direction and amount of an intensity change in the block and quantize them. The APIDQ can perform similar processing more simply.

Figure 2:
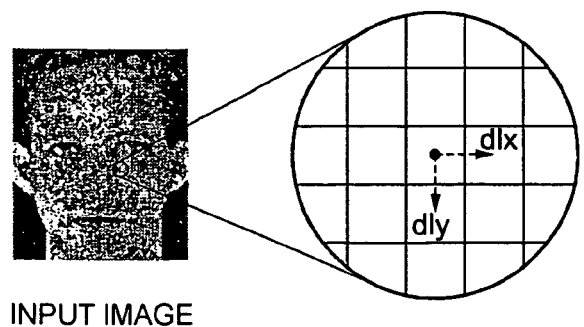
FIG. 2 is a diagram used in explaining calculation of adjacent pixel intensity differences according to the embodiment of this invention.

About step S2 in FIG. 1:

As shown in FIG. 2, in the APIDQ, an intensity difference (dIx) between pixels adjacent in the horizontal direction and an intensity difference (dIy) between pixels adjacent in the vertical direction are first calculated with respect to each pixel of an input face image by the use of the following simple subtraction operation.

$$dIx(i,j)=I(i+1,j)-I(i,j)$$

$$dIy(i,j)=I(i,j+1)-I(i,j)$$

Figure 3:
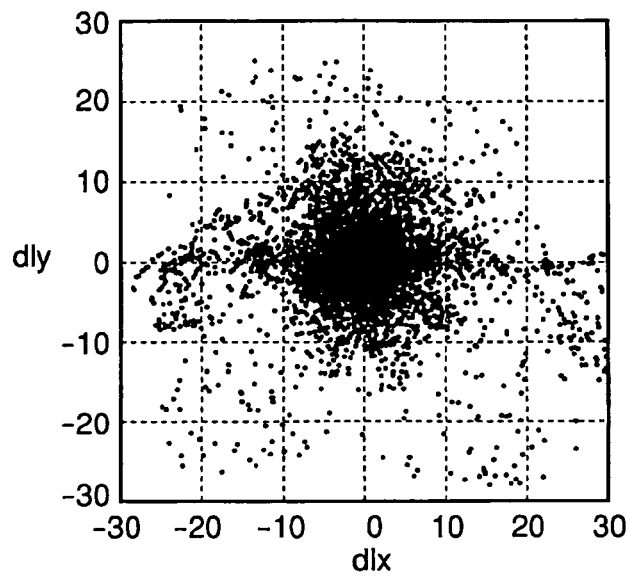
FIG. 3 is a diagram used in explaining the operation of the embodiment of this invention, wherein a typical example of (dIx, dIy) vector distribution is shown.

About step S3 in FIG. 1:

The calculated pair of dIx, dIy represent a single vector (intensity change vector) having an initial point (0, 0) in the dIx-dIy plane. After all the pixels in the input image have been processed, terminal points of the intensity change vectors are distributed in the dIx-dIy plane as shown in FIG. 3. The distribution (density and shape) of the terminal points of the intensity change vectors represent features of the input face image. By transforming the coordinate system from orthogonal coordinates to polar coordinates, an angle θ and a distance r of each vector represent a direction and an amount of an intensity change, respectively.

About step S4 in FIG. 1:

Then, each intensity change vector is quantized in the r-θ plane. One example of a quantization table is shown in the lower part of FIG. 4. Numbers 0 to 49 in the quantization table represent index numbers of the 0th to 49th quantization regions, respectively.

Figure 4:
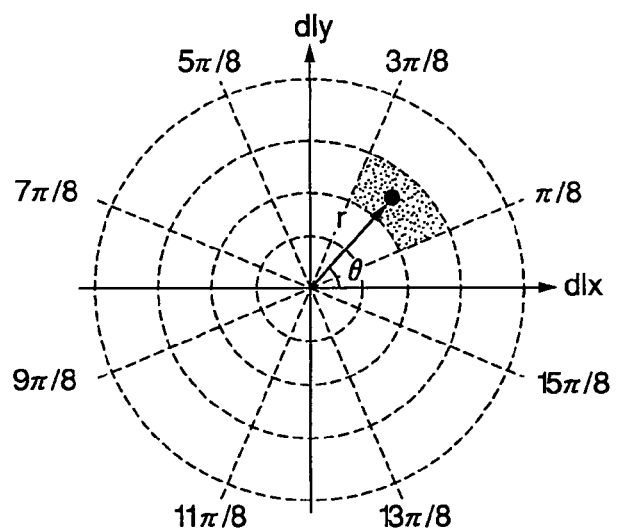
FIG. 4 is a diagram used in explaining the operation of the embodiment of this invention, wherein the r-θ plane and a quantization table are shown.

For example, θ of an intensity change vector shown in the upper part of FIG. 4 is located in a region between 3π/8 and π/8 and r of this intensity change vector is located in a third region from the inner side (r corresponds to a region between 2 and 4 in the quantization table in the lower part of FIG. 4). Therefore, this intensity change vector shown in the upper part of FIG. 4 is quantized as a quantization region of index number 10 on the basis of the quantization table in the lower part of FIG. 4.

About step S5 in FIG. 1:

The number of vectors quantized into each quantization region is counted. The counted number is indicated in a bar shape as frequency in a histogram (illustrated as FIG. 6 later) which is generated as having the axis of abscissas representing the index numbers 0 to 49 of the quantization regions. For example, the vector shown in the upper part of FIG. 4 forms a part of the frequency of the index number 10 in the histogram. This histogram serves as a feature vector of a human face.

About step S6 in FIG. 1:

In registration step S6, this histogram is stored in a database 10 as individual identification information.

About steps S7 and S8 in FIG. 1:

In recognition step S7, a histogram is generated from an unknown input face image and compared with registered individual histograms and the best matched one is output as a recognition result of database matching S8. The Manhattan distance (MD) between histograms is used as one example showing the degree of matching.

Referring back to step S1 in FIG. 1, attention is paid to the fact that the low-pass filtering is first carried out before the APIDQ by the use of a simple two-dimensional moving average filter. This low-pass filtering is essential for reducing high-frequency noise and extracting low-frequency components that are most effective for recognition.

Since the recognition algorithm is very simple and the developed face feature extraction method is totally different from the conventional recognition methods, combining it with the conventional methods is easy in a manner to enhance the recognition accuracy with the minimum additional cost and, further, is very effective, not only using it alone.

Now, description will be made about the results of a face recognition test using this invention.

Figure 5:
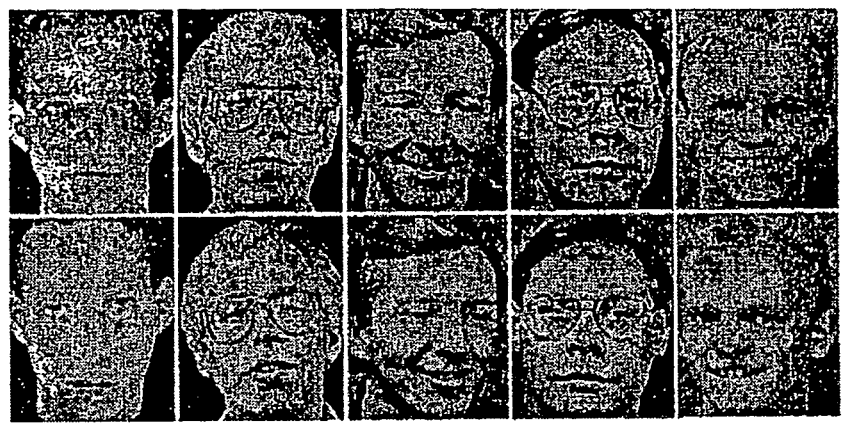
FIG. 5 is a diagram showing samples of typical face images of the AT&T database used in the embodiment of this invention.

The publicly available AT&T face database was used for the recognition test. The database includes 400 images in total of 40 individuals each having 10 face images with differences given by face angles, face expressions, and lighting conditions. Each image has a resolution of 92×112. FIG. 5 shows typical image samples of the AT&T database. Among the ten images of each individual, the five images were selected as input images for evaluation while the remaining five were registered as registration images in database. The recognition test was conducted with respect to 252 ($=_{10}C_5$) times combinations of the input image for evaluation and the registration image in database by the use of the rotation method.

Now, description will be made about the recognition performance according to this invention.

Figure 6:
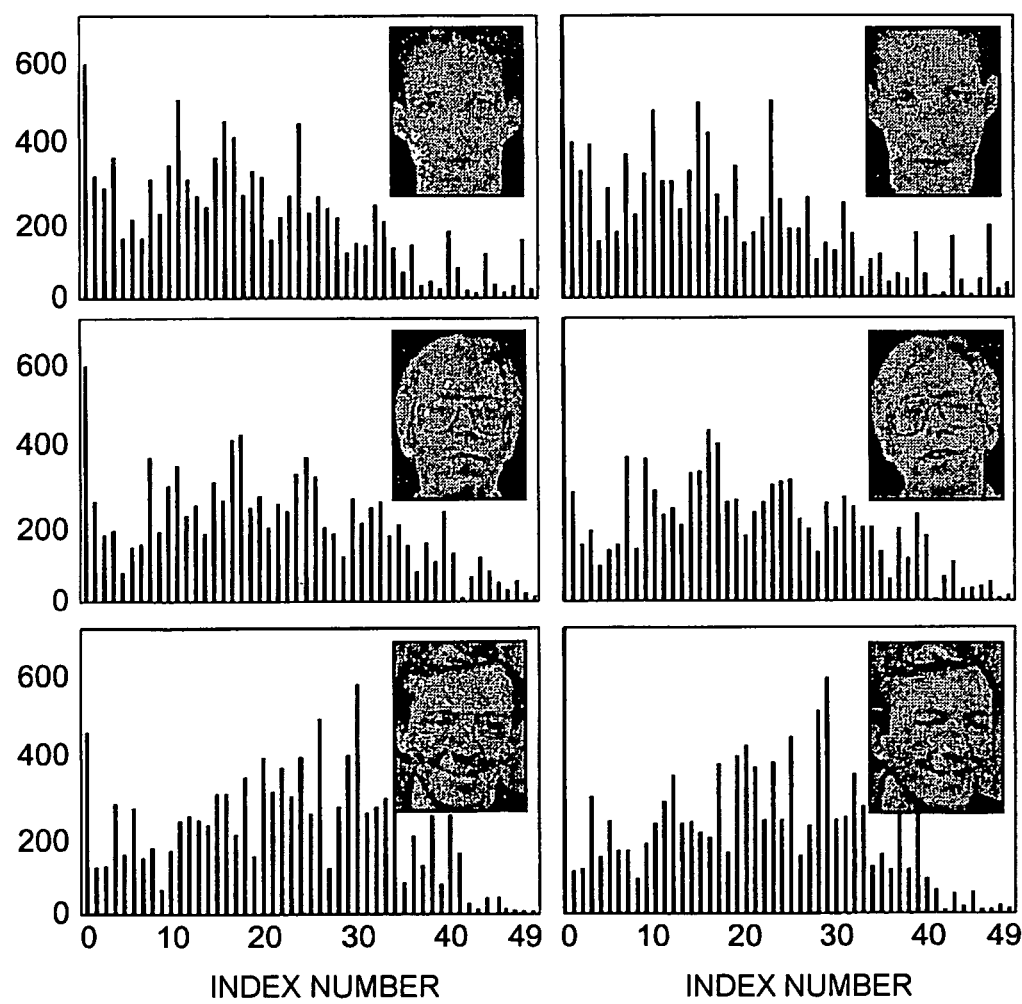
FIG. 6 is a diagram used in explaining the operation of the embodiment of this invention, wherein typical examples of histograms are shown.

FIG. 6 shows typical examples of histograms. The histograms of different individuals clearly differ from each other. However, the histograms of different images of the same individual resemble each other in many cases although there are small changes in details. It can be said that the histogram obtained by the APIDQ represents very effective individual features for recognizing a person.

Figure 7:
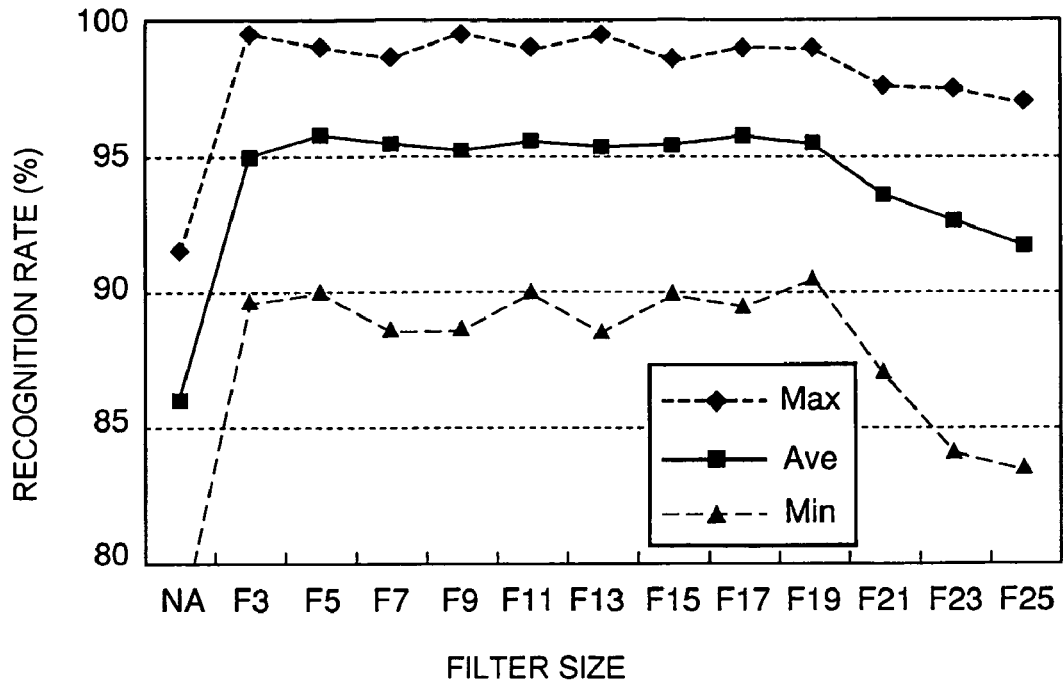
FIG. 7 is a diagram used in explaining the effect of the embodiment of this invention, wherein the recognition success rate is shown as a function of filter size.

The recognition results are shown in FIG. 7. In FIG. 7, the recognition rate is shown as a function of filter size. The filter size represents a size of an averaging filter core. The size of F3 represents, for example, a size of a 3×3 filter core. "Max", "Min", and "Ave" represent the best result, the worst result, and the average result, respectively, with respect to the 252 ($=_{10}C_5$) times combinations of the input image for evaluation and the registration image in database. The recognition rate is almost constant with respect to the filter sizes from F3 to F19 and the highest average recognition rate of 95.7% is obtained. This is almost equal to the case of the VQ histogram method (95.6%) under the same conditions. Detailed face features influenced by, for example, wrinkles, a local hairstyle, the image acquisition conditions, or the lapse of time, which reduce the recognition performance, are removed by the application of the low-pass filter. Only the important face features of each individual such as the rough shape of a face are extracted. Further, the APIDQ processing can effectively remove DC components of the pixel intensity that change according to the lighting conditions. By the combination of these two effects, it is possible to effectively extract the most important information for the face recognition.

Figure 8:
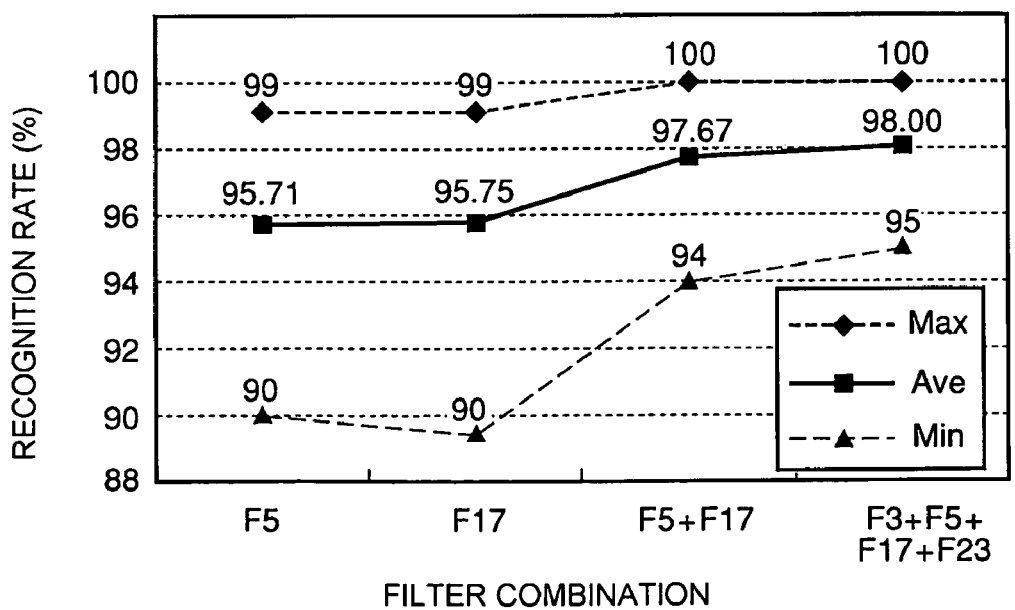
FIG. 8 is a diagram used in explaining the effect of the embodiment of this invention, wherein recognition results obtained by the use of multiple filters are shown.

As described above, the low-pass filtering is very effective for the face feature extraction using the APIDQ. It is possible to expect that different features can be extracted by the use of filters having different sizes. Therefore, more potent individual feature information can be acquired by combining multiple recognition results obtained by using multiple filter sizes. Actually, the recognition results (similarity scores) by different-size filters were first separately obtained and then combined by averaging. FIG. 8 shows the recognition results obtained by the use of multiple filters. Herein, F3, F5, F17, and F23 represent filter sizes of 3×3, 5×5, 17×17, and 23×23, respectively. By the use of multiple filters, the recognition rate increases by 2% and the average recognition rate becomes about 98%.

Now, description will be made about the recognition speed in this invention.

The recognition algorithm was programmed by the use of ANSIC and executed in a PC (AMD Athron 1.1 GHz). Quantization in the r-θ coordinates is implemented through simple conditional branches ("if" statements). The processing time for one image in the AT&T database was 37 msec (15 msec for low-pass filtering, 7 msec for APIDQ processing, and 15 msec for database matching). As compared with the VQ processing time in the VQ histogram method, the processing time for face feature extraction performed by the APIDQ was reduced from 164 msec (VQ) to 7 msec (APIDQ). The processing time was largely shortened. Further, since the simple conditional branches ("if" statements) used in the quantization is not so effective for calculation speed, an attempt was made to use the table lookup (TLU) method instead of the "if" statements. When the TLU was applied to the r-θ domain, the APIDQ processing time was reduced from 7 msec to 5 msec. Further, the TLU is directly applicable to the dIx-dIy domain. In this case, the APIDQ can be implemented within 1 msec so that the total recognition time becomes 31 msec. Although the face detection processing step is not included, the face recognition at video rate is enabled.

As described above, this invention can provide the very fast and highly reliable face recognition method called the APIDQ histogram method. This face recognition method is based on the proper filtering, the quantization of the intensity change directions and amounts, and the histogram generation and analysis. The excellent face recognition performance with the high recognition rate of 95.7% was confirmed by the use of the publicly available AT&T face database.

By directly applying the table lookup (TLU) method to the dIx-dIy domain, the total recognition processing time is only 31 msec, thus enabling the face recognition at video rate.

To summarize FIG. 1, it can be considered that the data recognition device according to the embodiment of this invention comprises the following data analysis device 100.

That is, the data analysis device 100 comprises difference calculation means (S2 in FIG. 1) for, with respect to an image, carrying out a calculation of calculating a difference between intensity values at an arbitrary point in the image and a point located in the vicinity of the arbitrary point in a first direction as a first intensity difference (dIx) of the arbitrary point and of calculating a difference between intensity values at the arbitrary point and a point located in the vicinity of the arbitrary point in a second direction different from the first direction (e.g. perpendicular to the first direction) as a second intensity difference (dIy) of the arbitrary point, the difference calculation means carrying out the calculation with respect to each of a plurality of points in the image, and frequency distribution generation means (S3 to S5 in FIG. 1) for allocating a vector (intensity change vector) comprising the first intensity difference and the second intensity difference obtained by the difference calculation means for each of the plurality of points in the image to a single region of a plurality of regions (regions represented by the index numbers 0 to 49 of the quantization table in FIG. 4) divided by a predetermined region division method and generating a frequency distribution of the plurality of regions by using the number of vectors allocated to each of the plurality of regions as frequency of the corresponding region.

Herein, the predetermined region division method is not limited to the method, used in the foregoing embodiment, that allocates an intensity change vector to a single region of a plurality of regions in the r-θ plane by coordinate transformation to the θ-r system, and other region division methods may be used as the predetermined region division method.

Further, the difference calculation means may, with respect to the image data, carry out a calculation of calculating an intensity difference dIx of an arbitrary point in an x-direction in an image as a difference between an intensity value at the arbitrary point and an intensity value at a point on a right side (or a point on a left side) of the arbitrary point and of calculating an intensity difference dIy of the arbitrary point in a y-direction as a difference between the intensity value at the arbitrary point and an intensity value at a point on a lower side (or a point on an upper side) of the arbitrary point, the difference calculation means carrying out the calculation with respect to each of a plurality of points in the image.

In the data analysis device 100, feature data may be produced by extracting a frequency distribution of at least a part of the plurality of regions from the frequency distribution of the plurality of regions generated by the frequency distribution generation means.

It can be considered that the data recognition device according to the embodiment of this invention comprises the following means in addition to the data analysis device 100.

That is, the data recognition device comprises frequency distribution storage means (database 10 in FIG. 1) for storing information of one or more frequency distributions with respect to at least one or more images, and comparison means (S8 in FIG. 1) for comparing between one or more frequency distributions about the image generated by the frequency distribution generation means and the one or more frequency distributions in the frequency distribution storage means.

Preferably, the comparison means compares between the one or more frequency distributions about the image generated by the frequency distribution generation means and the frequency distributions in the frequency distribution storage means and selects the frequency distribution specified by a predetermined comparison function from the respective frequency distributions stored in the frequency distribution storage means.

In this data recognition device, the one or more frequency distributions about the image generated by the frequency distribution generation means may be one or more frequency distributions of a part of the plurality of regions extracted from the frequency distribution of the plurality of regions generated by the frequency distribution generation means.

The data recognition device may comprise frequency distribution registration means (S6 in FIG. 1) for registering the frequency distribution generated by the frequency distribution generation means into the frequency distribution storage means when, as a result of the comparison by the comparison means (S8 in FIG. 1), the frequency distribution to be selected by the predetermined comparison function does not exist in the frequency distribution storage means.

The data recognition device may further comprise filter means (S1 in FIG. 1) for applying filtering to input image data and the difference calculation means may carry out the difference calculation with respect to the image data applied with the filtering by the filter means.

The filter means (S1 in FIG. 1) is not limited to the low-pass filter used in the foregoing embodiment and other filters may be used as this filter means.

Alternatively, a plurality of filter means may be provided for applying a plurality of filtering processes to the input image data and the difference calculation means may carry out the difference calculation with respect to the image data applied with the filtering processes by the plurality of filter means.

In this case, the data recognition device may comprise frequency distribution storage means for storing, in a plurality of sets, information of the frequency distributions of the plurality of regions, and comparison means for comparing between the frequency distribution about the input image data generated by the frequency distribution generation means and the respective sets of the frequency distributions in the frequency distribution storage means and selecting one set of the frequency distributions specified by a predetermined comparison function from the respective sets of the frequency distributions stored in the frequency distribution storage means.

This invention is not limited to the application to the face recognition described in the foregoing embodiment, but may naturally be applied to high-speed data recognition of general images or other large volume data.

As described above, according to this invention, there are obtained a data analysis device that achieves high processing speed and a data recognition device using such a data analysis device, thereby enabling high-speed data recognition or instantaneous data recognition.

The invention claimed is:

1. A data analysis device characterized by comprising:

difference calculation means for, with respect to an image, carrying out a calculation of calculating a difference between intensity values at an arbitrary point in said image and a point located in the vicinity of said arbitrary point in a first direction as a first intensity difference of said arbitrary point and of calculating a difference between intensity values at said arbitrary point and a point located in the vicinity of said arbitrary point in a second direction different from said first direction as a second intensity difference of said arbitrary point, said difference calculation means carrying out said calculation with respect to each of a plurality of points in said image, and frequency distribution generation means for allocating a vector comprising said first intensity difference and said second intensity difference obtained by said difference calculation means for each of the plurality of points in said image to a single region of a plurality of regions divided by a predetermined region division method and generating a frequency distribution of said plurality of regions by using the number of vectors allocated to each of said plurality of regions as frequency of the corresponding region.

2. A data analysis device according to claim 1, characterized by producing feature data by extracting a frequency distribution of at least a part of said plurality of regions from the frequency distribution of said plurality of regions generated by said frequency distribution generation means.

3. A data analysis device according to claim 1, characterized by applying filtering to said image before said difference calculation means carries out said calculation with respect to said image.

4. A data recognition device characterized by comprising frequency distribution storage means for storing information of one or more frequency distributions with respect to at least one or more images, difference calculation means for, with respect to an image, carrying out a calculation of calculating a difference between intensity values at an arbitrary point in said image and a point located in the vicinity of said arbitrary point in a first direction as a first intensity difference of said arbitrary point and of calculating a difference between intensity values at said arbitrary point and a point located in the vicinity of said arbitrary point in a second direction different from said first direction as a second intensity difference of said arbitrary point, said difference calculation means carrying out said calculation with respect to each of a plurality of points in said image, frequency distribution generation means for allocating a vector comprising said first intensity difference and said second intensity difference obtained by said difference calculation means for each of the plurality of points in said image to a single region of a plurality of regions divided by a predetermined region division method and generating a frequency distribution of said plurality of regions by using the number of vectors allocated to each of said plurality of regions as frequency of the corresponding region, and comparison means for comparing between one or more frequency distributions about said image generated by said frequency distribution generation means and said one or more frequency distributions in said frequency distribution storage means.

5. A data recognition device according to claim 4, characterized in that said comparison means compares between said one or more frequency distributions about said image generated by said frequency distribution generation means and said frequency distributions in said frequency distribution storage means and selects the frequency distribution specified by a predetermined comparison function from the respective frequency distributions stored in said frequency distribution storage means.

6. A data recognition device according to claim 5, characterized in that said one or more frequency distributions about said image generated by said frequency distribution generation means are one or more frequency distributions of a part of said plurality of regions extracted from the frequency distribution of said plurality of regions generated by said frequency distribution generation means.

7. A data recognition device according to claim 4, characterized by applying filtering to said image before said difference calculation means performs said calculation with respect to said image.

8. A data recognition device characterized by comprising filter means for applying filtering to input image data,
difference calculation means for, with respect to the image data applied with the filtering by said filter means, carrying out a calculation of calculating an intensity difference $dIx$ of an arbitrary point in an x-direction in an image as a difference between an intensity value at said arbitrary point and an intensity value at a point on a right or left side of said arbitrary point and of calculating an intensity difference $dIy$ of said arbitrary point in a y-direction as a difference between the intensity value at said arbitrary point and an intensity value at a point on a lower or upper side of said arbitrary point, said difference calculation means carrying out said calculation with respect to each of a plurality of points in said image,
frequency distribution generation means for allocating a vector comprising said intensity difference in the x-direction and said intensity difference in the y-direction obtained by said difference calculation means for each of the plurality of points in said image to a single region of a plurality of regions divided by a predetermined region division method and generating a frequency distribution of said plurality of regions by using the number of vectors allocated to each of said plurality of regions as frequency of the corresponding region,
frequency distribution storage means for storing information of at least one or more frequency distributions, and
comparison means for comparing between the frequency distribution about said input image data generated by said frequency distribution generation means and said frequency distributions in said frequency distribution storage means and selecting the frequency distribution specified by a predetermined comparison function from the respective frequency distributions stored in said frequency distribution storage means.

9. A data recognition device characterized by comprising a plurality of filter means for applying a plurality of filtering processes to input image data,
difference calculation means for, with respect to the image data applied with the filtering processes by said plurality of filter means, carrying out a calculation of calculating an intensity difference $dIx$ of an arbitrary point in an x-direction in an image as a difference between an intensity value at said arbitrary point and an intensity value at a point on a right or left side of said arbitrary point and of calculating an intensity difference $dIy$ of said arbitrary point in a y-direction as a difference between the intensity value at said arbitrary point and an intensity value at a point on a lower or upper side of said arbitrary point, said difference calculation means carrying out said calculation with respect to each of a plurality of points in said image,
frequency distribution generation means for allocating a vector comprising said intensity difference in the x-direction and said intensity difference in the y-direction obtained by said difference calculation means for each of the plurality of points in said image to a single region of a plurality of regions divided by a predetermined region division method and generating a frequency distribution of said plurality of regions by using the number of vectors allocated to each of said plurality of regions as frequency of the corresponding region,
frequency distribution storage means for storing, in a plurality of sets, information of the frequency distributions of said plurality of regions, and
comparison means for comparing between the frequency distribution about said input image data generated by said frequency distribution generation means and the respective sets of the frequency distributions in said frequency distribution storage means and selecting one set of the frequency distributions specified by a predetermined comparison function from the respective sets of the frequency distributions stored in said frequency distribution storage means.

10. A data recognition device according to claim 5, characterized by comprising frequency distribution registration means for registering the frequency distribution generated by said frequency distribution generation means into said frequency distribution storage means when, as a result of the comparison by said comparison means, the frequency distribution to be selected by said predetermined comparison function does not exist in said frequency distribution storage means.

11. A data analysis device according to claim 2, characterized by applying filtering to said image before said difference calculation means carries out said calculation with respect to said image.

12. A data recognition device according to claim 5, characterized by applying filtering to said image before said difference calculation means performs said calculation with respect to said image.

13. A data recognition device according to claim 6, characterized by applying filtering to said image before said difference calculation means performs said calculation with respect to said image.

14. A data recognition device according to claim 6, characterized by comprising frequency distribution registration means for registering the frequency distribution generated by said frequency distribution generation means into said frequency distribution storage means when, as a result of the comparison by said comparison means, the frequency distribution to be selected by said predetermined comparison function does not exist in said frequency distribution storage means.

15. A data recognition device according to claim 8, characterized by comprising frequency distribution registration means for registering the frequency distribution generated by said frequency distribution generation means into said frequency distribution storage means when, as a result of the comparison by said comparison means, the frequency distribution to be selected by said predetermined comparison function does not exist in said frequency distribution storage means.

16. A data recognition device according to claim 9, characterized by comprising frequency distribution registration means for registering the frequency distribution generated by said frequency distribution generation means into said frequency distribution storage means when, as a result of the comparison by said comparison means, the frequency distribution to be selected by said predetermined comparison function does not exist in said frequency distribution storage means.

* * * * *